May 22, 1956 E. T. RIDGWAY 2,746,789
CORRUGATED SHEATHING SPOT-WELDED TO FRAME MEMBERS, ESPECIALLY FOR VEHICLE BODIES
Original Filed March 24, 1949
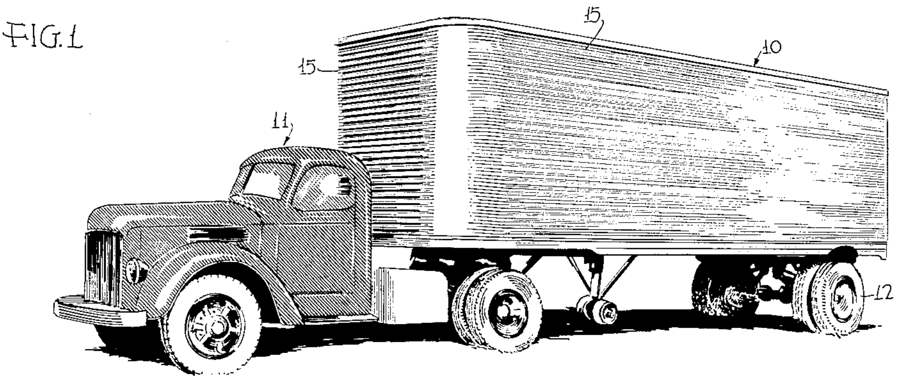
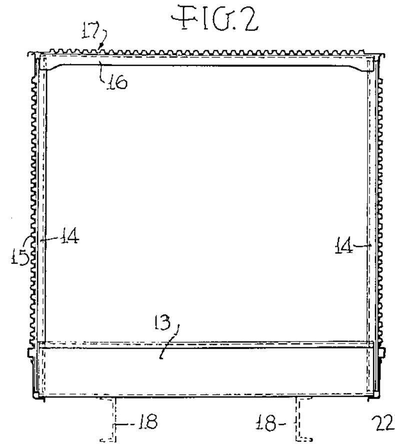
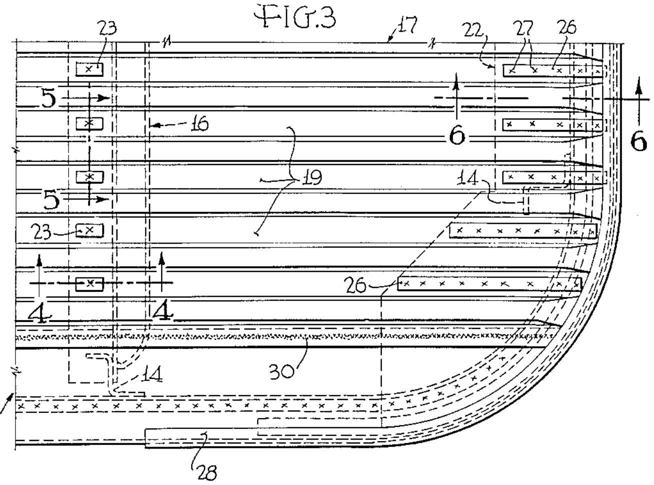
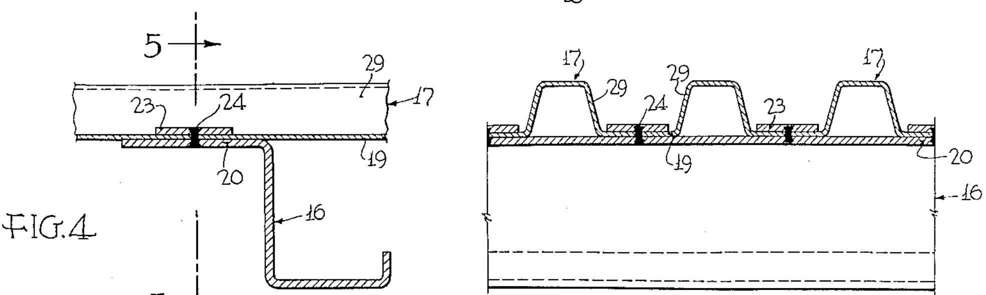
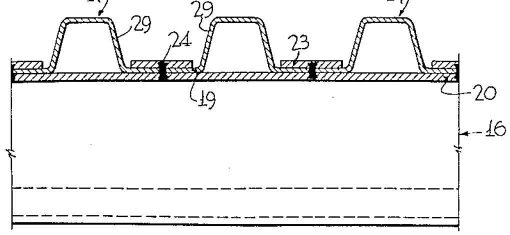
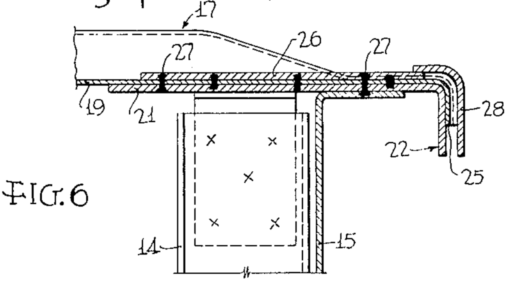
INVENTOR.
Edmund T. Ridgway
BY
Maurice A. Crews
ATTORNEY 2,746,789

CORRUGATED SHEATHING SPOT-WELDED TO FRAME MEMBERS, ESPECIALLY FOR VEHICLE BODIES

Edmund T. Ridgway, Oaklyn, N. J., assignor to The Budd Company, Philadelphia, Pa., a corporation of Pennsylvania Continuation of abandoned application Serial No. 83,214, March 24, 1949. This application March 23, 1953, Serial No. 344,097

2 Claims. (Cl. 296—29)

The invention relates to connections by electric spot-welding between thin-gauge corrugated metal sheathing and heavier gauge frame members, especially for vehicle bodies, as truck and trailer bodies or the like. More specifically, the invention relates to corrugated roof sheathings spot-welded to carlines.

The main object of the invention is the prevention of leakage due to welds being torn out of the sheathing at the bottoms of the corrugations.

Further objects of the invention are the achievement of the aforesaid main object without any noticeable increase of the over-all body weight, without any noticeable increase but rather with a reduction of the material and labor required for making the improved body, and with an increase of the strength.

In the use of truck and trailer bodies, certain types of abnormal strains, such as caused by pieces of cargo being pushed from the inside against the sheathing or by collision shocks exerted on the body, often lead to the breaking of some spot welds connecting the sheathing and the frame members. Such breaks, in the hitherto customary construction of the bodies, do not occur in the welds proper, but the welds tear out of the thin sheathing. From the strength angle, the destruction of some of the welds is not serious, even in the case of self-supporting bodies in which the sheathing is a main load-supporting and stress-transmitting element. However, the holes are very objectionable because they occur at the bottoms of the corrugations where, in the case of a roof sheathing, rain water collects and thence enters the interior of the body through the holes, causing damage to the cargo and to the inner lining of the body.

Different attempts to overcome the described, objectionable condition were found unsatisfactory for one reason or another, such as being uneconomical or influencing adversely other necessary characteristics of the construction. The invention offers, however, a solution of the problem which is free of undesirable or even prohibitive drawbacks of the previous attempts.

The invention solves the problem and achieves the above aims by placing small parallel-sided sheet metal pads or plates on the outside of the flat bottom walls of the corrugations at the intersections with the supporting frame members, and by connecting said pads, sheathing and frame members by spot welds extending through or into all three of these elements. These pads either prevent the welds from being broken or they cause the welds to be broken at or torn out from the frame members while leaving the sheathing intact.

This application is a continuation of applicant's original application, Serial No. 83,214, Roof for Trailer and the Like of Corrugated Sheathing Spot Welded to Frame Members, filed March 24, 1949, and now abandoned.

One embodiment of the invention is illustrated in the attached drawing and described in the following.

In the drawing:

Fig. 1 is a small-scale diagrammatic perspective view of a semi-trailer of the type to which the invention is applied, the front end of the trailer being supported by a conventional tractor;

Fig. 2 is a small-scale diagrammatic cross section through the mid-portion of the trailer illustrated in Fig 1;

Fig. 3 is a fragmentary plan view of the right hand front corner of the roof of the trailer shown in Fig. 1 but on a larger scale; and Figs. 4, 5, and 6 are fragmentary sections along the correspondingly numbered lines of Fig. 3 on a still larger scale, section line 5—5 appearing also in Fig. 4.

Trailer 10 has its front end supported on the four-wheeled tractor 11 and its rear end on wheels 12. The illustrated trailer is of the self-supporting type in which a floor structure, comprising longitudinally spaced transverse floor beams 13, is structurally connected with the lower marginal portions of the front wall and the side walls, comprising posts 14 and outer sheathing 15, and in which the upper ends of these walls are structurally connected with the roof, comprising transverse carlines 16 and a longitudinally corrugated roof sheathing 17. The rear wheels are attached through their axle and through springs to short frame members 18 extending across the underside of several of the beams 13.

The roof sheathing 17 rests by the bottom walls 19 of its corrugations on the upper horizontal arms 20 of the Z-section carlines 16 and on top of the horizontal arms 21 of angle-section front and side rails 22.

Small parallel-sided or rectangular sheet metal pads or plates 23 are placed at the intersections of the bottom walls 19 of the corrugations with arms 20 of the carlines 16. The three sheet metal layers 23, 19, and 20 are connected with each other by single spot welds 24 of ordinary size and characteristics. The welds 24 are placed substantially midway between the side margins of the pads.

The front ends of the corrugations are flattened and the flattened portions are bent downwardly at 25 so as to nest over the angle-shaped front rail 22, as shown in Fig. 6. Placed between the front portions of the corrugations are elongated pads 26 each secured by several customary spot welds 27 to the bottom walls 19 of the sheathing and arm 21 of the front rail, as shown in Figs. 3 and 6. An angle-section trim rail 28, held by welds, screws or rivets, may cover the outside of the angle-section front margin of the roof sheathing 17 and the forward ends of the pads 26.

The width of the pads 23 and 26 between their opposite parallel margins is smaller than the width of the bottom walls 19 between the side walls 29 of the corrugations so that the pads will allow water to pass between them and walls 29 on its way to the ends of the corrugations where the water is discharged, and so that the pads are restricted to the flat portion of bottom walls 19 while ending short of the rounded corners between walls 19 and 29.

Except for the continuous seam weld 30 between the lateral margins of the roof sheathing 17 and the side rails 22, Fig. 3, all individual spot-weld connections between the sheathing 17 and the supporting frame members include pads 23 or 26. The end rail (not shown) at the rear of the body is connected with the sheathing in substantially the same way as the front rail, though in the specific illustrated construction shorter pads and only two welds are required at the rear. Pads are even employed, so as to be entirely safe, where the individual corrugated strips, which together form the sheathing, overlap and are seam welded to each other. The well known connection between the individual corrugated strips is not shown in the drawing.

As an example for appropriate dimensions may serve a trailer body construction of the illustrated type made of austenitic stainless steel.

For a roof sheathing 17 having corrugations with bottom walls 19 of about ¾" width, the width of the pads might, for instance, be ⅝", and the length of the pads 23 at the carline intersections may be ¾". The length of the pads 26 depends on the length of the overlap between roof sheathing and marginal end rail.

The gauge of the roof sheathing may be 0.014" with 100,000 p. s. i. tensile strength, and the gauge of the carlines and end rails may be 0.05" and 0.06", respectively, with tensile strengths of 150,000 p. s. i. and more.

For such sheathing and frame members, the pads should preferably likewise consist of stainless steel and may have a gauge of 0.06", that is: a gauge about equal to the gauge of the frame members.

The spot welds 24, diagrammatically illustrated in the drawing, comply with the standards well established in the art as, for instance, specified in "Welding Hand Book" 1942 edition (American Welding Society, New York), page 819. This leads to weld diameters of about .22", that is: about 7/32".

For the above-exemplified pads of ⅝" width, the diameter of the spot welds would amount to about one-third of the width of the pad, i. e. a minor part only of the width of the pad.

Beneficial results are obtainable with thinner pads, such as of 0.03" to 0.04" gauge or even less, for frame members of the above indicated gauges. On the other hand, the gauge of the pads may even be greater than specified above so that, if extraordinary forces should be encountered, there would be no risk that welds are torn out of the pads and the roof sheathing.

It is obvious that the weight of the pads is scarcely noticeable and is but an insignificant fraction of the total weight of the vehicle structure. This holds true even if the pads should be made of relatively thick material. The placing of the pads at the weld spots consumes so little time that it does not add anything to the work of making the welds but actually reduces the total time for making the connections because only one large weld is required and because less care in making the welds is needed on account of elimination of the danger of burning through the thin roof sheathing.

The pads and the strong welds increase the strength of the connection to such a degree that tearing out of the welds is not expected to occur at all. The rectangular form of the pads is not only economical to make but also affords the greatest surface compatible with the limited space between the side walls of the corrugations.

The arrangement of the side margins of the pads close to and along the side margins of the bottom walls of the corrugations provides for maximum strength and stability of the connection between the sheathing and the frame members, because the pads engage the lateral portions of the bottom walls of the sheathing over a greater length and area than attainable with differently shaped or arranged pads.

When applied to the roof, the appearance of the vehicle is not at all affected because the pads are hidden from view by the upwardly projecting portions of the corrugations.

The invention is not restricted to the details of the illustrated and described embodiment but is, without departing from its spirit, adaptable to sheathings of different gauge and material and to different dimensions of the corrugations.

What is claimed is:

1. In a wall structure, especially of a vehicle body: a sheathing of thin gauge corrugated sheet metal, the corrugations having flat imperforate bottom walls adjoined along their margins by side walls; sheet metal frame members of a gauge substantially heavier than said sheathing; said members extending transversely to the corrugations and having a web overlapped by the bottom walls of the sheathing; plane sheet metal pads of a substantially constant gauge, such gauge being greater than the gauge of said sheathing, said pads having parallel opposite margins and a width between said margins slightly less than but close to the width of said bottom walls between the side walls of the corrugations; said pads being arranged on said imperforate bottom walls at their intersections with said frame members and having their said parallel margins arranged along and close to the margins of said bottom walls; said pads, bottom walls and webs being interconnected by single spot welds arranged in the mid-region between said side margins of the pads and having a diameter extending across a minor part only of the width of said pads.

2. In a wall structure according to claim 1, having a metal pad in the form of an elongated strip arranged longitudinally on one of said imperforate bottom walls, and a plurality of said spot welds arranged seriatim along the longitudinal mid-region of said strip and imperforate bottom wall.

References Cited in the file of this patent

UNITED STATES PATENTS

| | | |
|---|---|---|
| 2,014,090 | Schnetzer | Sept. 10, 1935 |
| 2,171,426 | Dean | Aug. 29, 1939 |
| 2,305,397 | Watter | Dec. 15, 1942 |
| 2,319,455 | Hardman et al. | May 18, 1943 |